United States Patent
Siegmund et al.

(10) Patent No.: US 12,314,751 B2
(45) Date of Patent: May 27, 2025

(54) VIRTUAL MACHINE BOOTSTRAP AGENT

(71) Applicant: Schlumberger Technology Corporation, Sugar Land, TX (US)

(72) Inventors: Frederik Siegmund, Abingdon (GB); Kevin Haritmonds, Pune (IN); Paul Henri Carton, Houston, TX (US); Waikhom Imocha Singh, Pune (IN)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 231 days.

(21) Appl. No.: 17/906,865

(22) PCT Filed: Mar. 24, 2021

(86) PCT No.: PCT/US2021/023928
§ 371 (c)(1),
(2) Date: Sep. 21, 2022

(87) PCT Pub. No.: WO2021/195242
PCT Pub. Date: Sep. 30, 2021

(65) Prior Publication Data
US 2023/0144217 A1    May 11, 2023

Related U.S. Application Data

(60) Provisional application No. 62/994,705, filed on Mar. 25, 2020.

(51) Int. Cl.
*G06F 9/455*   (2018.01)
*G06F 8/61*    (2018.01)
*G06F 9/4401*  (2018.01)

(52) U.S. Cl.
CPC ............ *G06F 9/45558* (2013.01); *G06F 8/61* (2013.01); *G06F 9/4401* (2013.01); *G06F 2009/45562* (2013.01); *G06F 2009/45575* (2013.01)

(58) Field of Classification Search
None
See application file for complete search history.

(56) References Cited

U.S. PATENT DOCUMENTS

| | | | | |
|---|---|---|---|---|
| 6,493,871 | B1 * | 12/2002 | McGuire | G06F 8/65 717/172 |
| 8,914,626 | B1 * | 12/2014 | Adogla | G06F 9/4401 709/227 |

(Continued)

OTHER PUBLICATIONS

Search Report and Written Opinion of International Patent Application No. PCT/US2021/023928 dated Jul. 15, 2021, 9 pages.

(Continued)

*Primary Examiner* — Lewis A Bullock, Jr.
*Assistant Examiner* — Jordan Scott Motter
(74) *Attorney, Agent, or Firm* — Jeffrey D. Frantz

(57) ABSTRACT

A method may include generating, by a cloud computing service, a user virtual machine from an image virtual machine and a template comprising a uniform resource locator (URL) of a bootstrap script by: downloading, in the user virtual machine and from the URL, the bootstrap script, and executing the bootstrap script to install a bootstrap agent as a startup service in the user virtual machine. The cloud computing service may limit execution of the bootstrap script in the user virtual machine to generating the user virtual machine. The bootstrap script may include instructions to install the bootstrap agent. The method may further include executing, by the user virtual machine, the startup service to install packages.

15 Claims, 6 Drawing Sheets

(56) References Cited

U.S. PATENT DOCUMENTS

| | | | |
|---|---|---|---|
| 2002/0112232 A1* | 8/2002 | Ream | G06F 8/61 |
| | | | 717/176 |
| 2002/0152277 A1* | 10/2002 | Drees | H04L 41/046 |
| | | | 709/208 |
| 2004/0103412 A1* | 5/2004 | Rao | G06F 8/65 |
| | | | 717/176 |
| 2008/0288962 A1* | 11/2008 | Greifeneder | G06F 9/44536 |
| | | | 713/2 |
| 2012/0030672 A1 | 2/2012 | Zygmuntowicz et al. | |
| 2015/0058837 A1 | 2/2015 | Govindankutty | |
| 2015/0178118 A1 | 6/2015 | Morariu | |
| 2015/0378708 A1 | 12/2015 | Nagaraja et al. | |
| 2017/0134301 A1* | 5/2017 | Chen | H04L 67/10 |
| 2017/0147392 A1 | 5/2017 | Kothari et al. | |
| 2018/0173526 A1* | 6/2018 | Prinsloo | G06F 8/71 |
| 2019/0050296 A1 | 2/2019 | Luo et al. | |
| 2020/0050478 A1* | 2/2020 | Underwood | G06F 9/4812 |

OTHER PUBLICATIONS

International Preliminary Report on Patenttability of International Patent Application No. PCT/US2021/023928 dated Sep. 22, 2022, 5 pages.

Extended Search Report issued in European Patent Application No. 21774806.0 dated Jun. 25, 2024, 8 pages.

\* cited by examiner

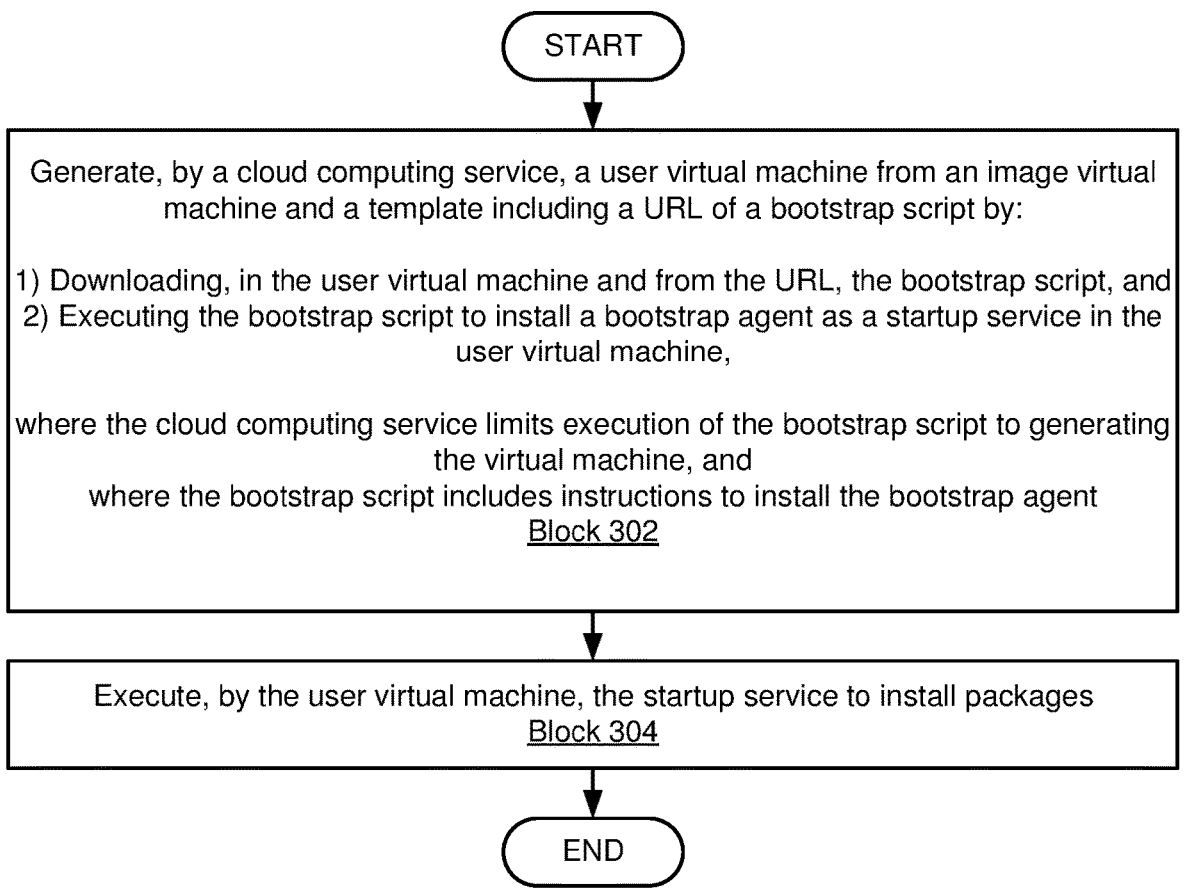
FIG. 3.1

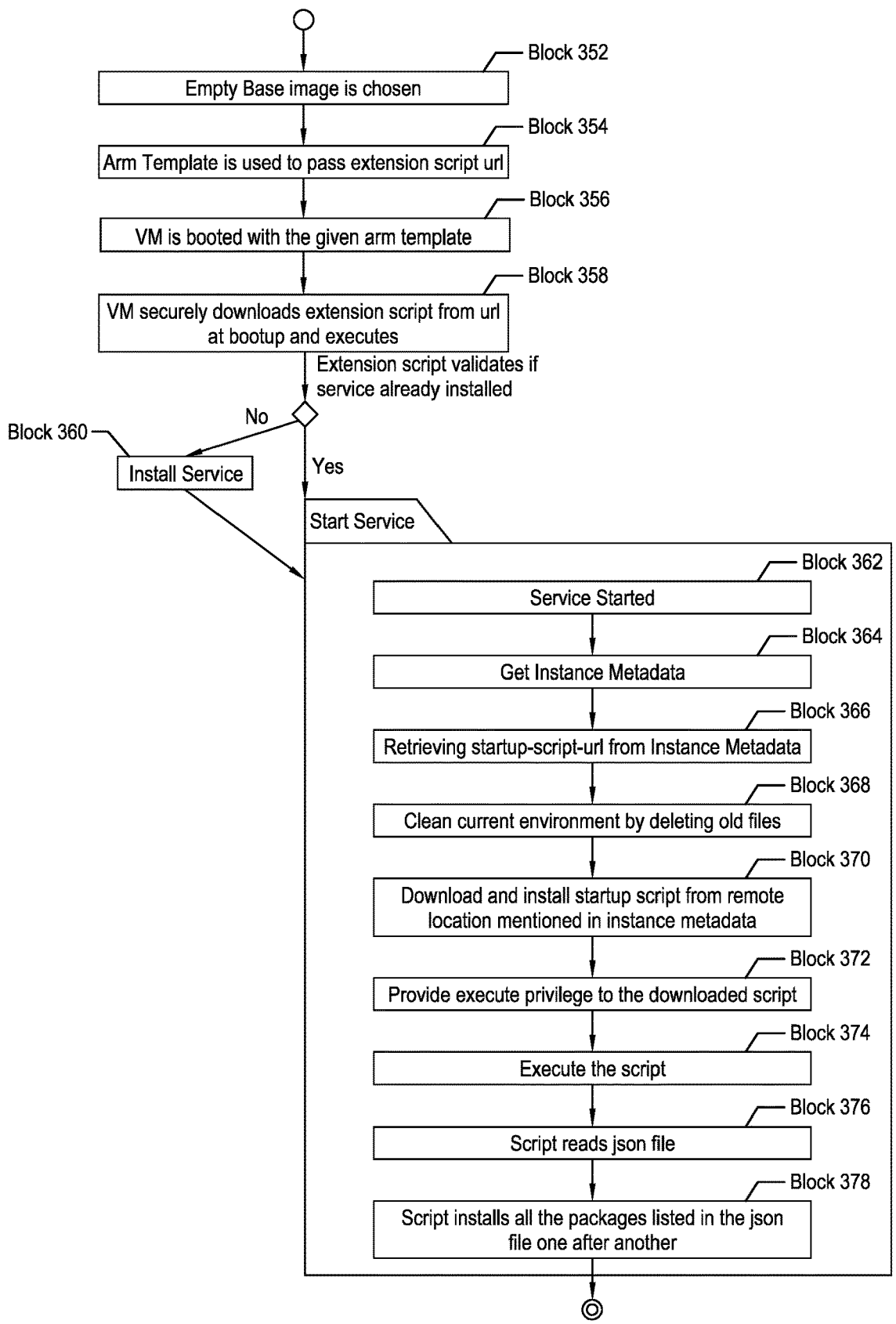
FIG. 3.2

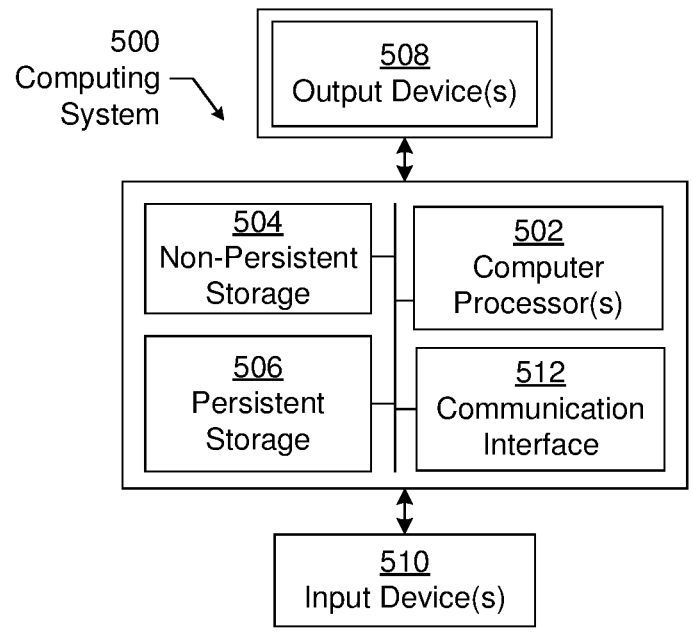
FIG. 5.1
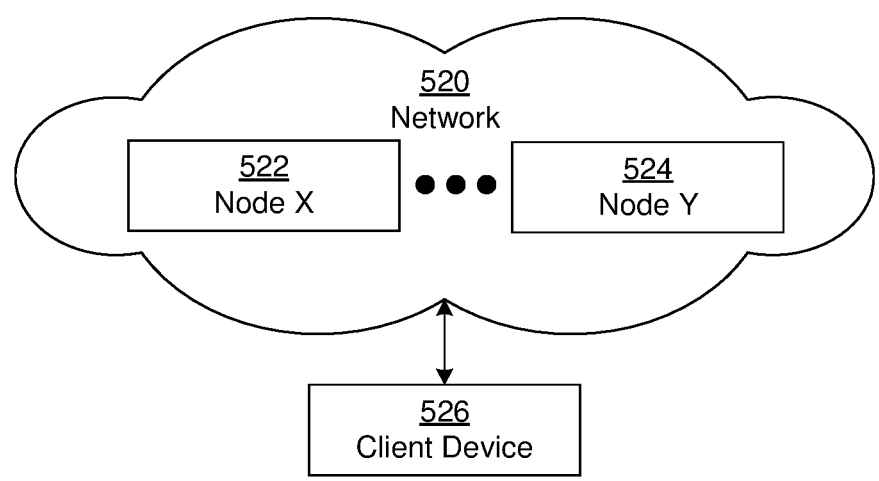
FIG. 5.2

VIRTUAL MACHINE BOOTSTRAP AGENT

CROSS-REFERENCE TO RELATED APPLICATION

This application is a National Stage Entry of International Patent Application No. PCT/US2021/023928, filed on Mar. 24, 2021, which claims benefit under 35 U.S.C. § 119 (e) to U.S. Provisional Patent Application Ser. No. 62/994,705, filed on Mar. 25, 2020, having the same inventors, and entitled "STRATUS AGENT." U.S. Provisional Patent Application Ser. No. 62/994,705 is incorporated herein by reference in its entirety.

BACKGROUND

A cloud computing service may generate specialized virtual machines for different users. The specialized virtual machines may include packages (e.g., software components) specific to the needs of the different users. Ideally, the user-specific packages are installed each time the specialized virtual machine reboots. However, a cloud computing service may limit the installation and/or execution of scripts (e.g., shell scripts) when a specialized virtual machine reboots.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In general, in one aspect, one or more embodiments relate to a method including generating, by a cloud computing service, a user virtual machine from an image virtual machine and a template comprising a uniform resource locator (URL) of a bootstrap script by: downloading, in the user virtual machine and from the URL, the bootstrap script, and executing the bootstrap script to install a bootstrap agent as a startup service in the user virtual machine. The cloud computing service limits execution of the bootstrap script in the user virtual machine to generating the user virtual machine. The bootstrap script includes instructions to install the bootstrap agent. The method further includes executing, by the user virtual machine, the startup service to install packages. Other aspects of the disclosure will be apparent from the following description and the appended claims.

BRIEF DESCRIPTION OF DRAWINGS

FIG. 3.1 and FIG. 3.2 show flowcharts in accordance with one or more embodiments.

FIGS. 5.1 and 5.2 show diagrams of a computing system in accordance with one or more embodiments.

DETAILED DESCRIPTION

Figure 1:
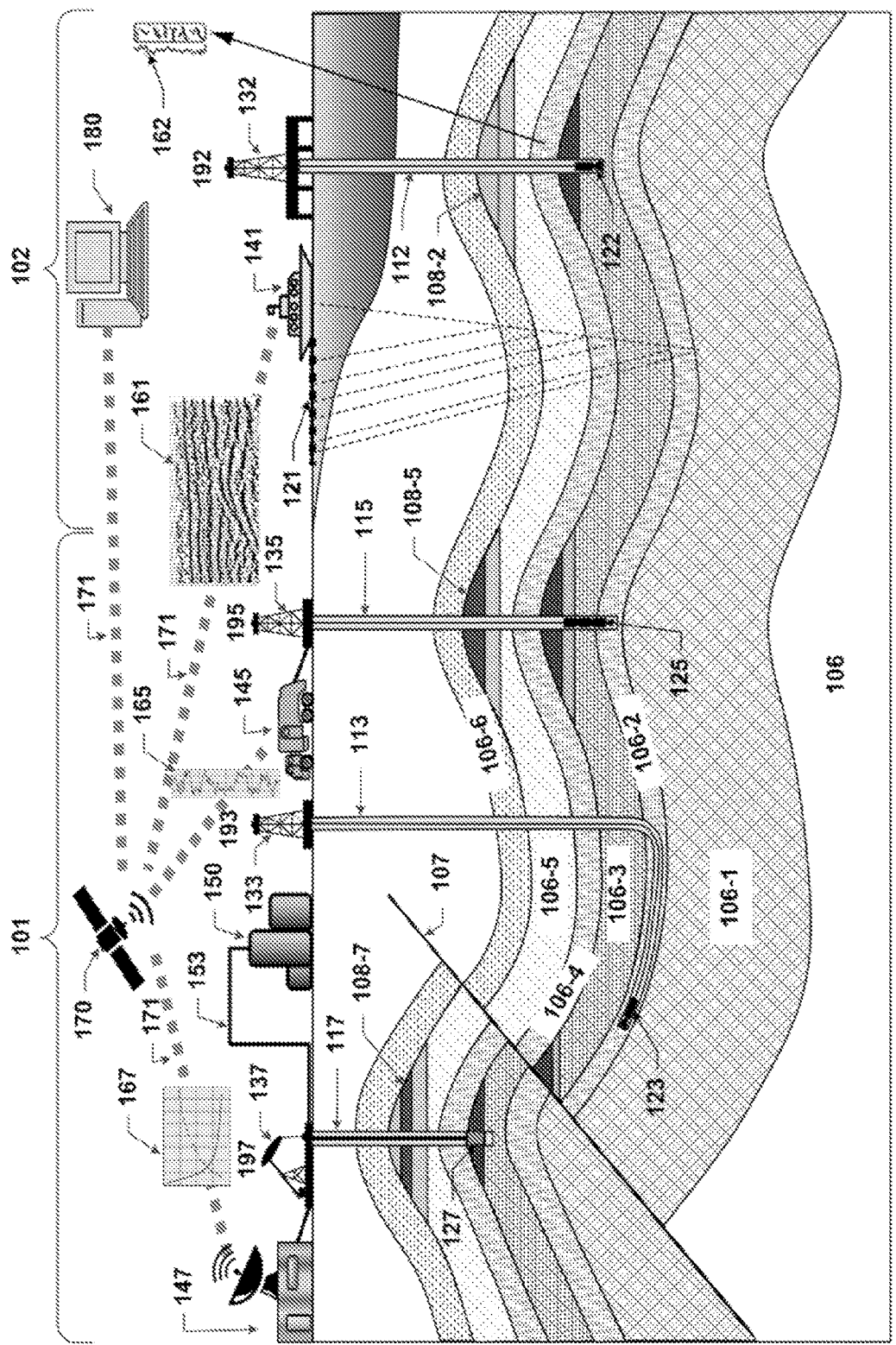
FIG. 1 shows a diagram of a field in accordance with one or more embodiments.

Specific embodiments of the disclosure will now be described in detail with reference to the accompanying figures. Like elements in the various figures are denoted by like reference numerals for consistency.

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the disclosure are directed to executing a bootstrap agent in a virtual machine. A cloud computing service may generate a user virtual machine from an image virtual machine and a template. The image virtual machine includes software components (e.g., an operating system, device drivers, etc.) to be included in one or more user virtual machines. The template is a file that may include a uniform resource locator (URL) of a bootstrap script that includes instructions for installing the bootstrap agent as a startup service in a user virtual machine. The bootstrap agent includes functionality to install, in the user virtual machine, one or more packages (e.g., software components) that are specific to the user. The template may further include metadata corresponding to the user virtual machine. The metadata includes a URL of a startup script that references a file including URLs of the packages to be installed in the user virtual machine.

In one or more embodiments, the cloud computing service limits execution of the bootstrap script to the generation of the user virtual machine. The cloud computing service may disable execution of the bootstrap script when rebooting an already-generated user virtual machine. The startup service is executed each time the user virtual machine is booted. That is, the startup service is executed the first time the user virtual machine is booted, and the startup service is executed in subsequent reboots of the user virtual machine. The startup service executes after rebooting an already-generated user virtual machine despite the limits that may be placed on the execution of the bootstrap script by the cloud computing service.

FIG. 1 depicts a schematic view, partially in cross section, of an onshore field (101) and an offshore field (102) in which one or more embodiments may be implemented. In one or more embodiments, one or more of the modules and elements shown in FIG. 1 may be omitted, repeated, and/or substituted. Accordingly, embodiments should not be considered limited to the specific arrangement of modules shown in FIG. 1.

As shown in FIG. 1, the fields (101), (102) include a geologic sedimentary basin (106), wellsite systems (192), (193), (195), (197), wellbores (112), (113), (115), (117), data acquisition tools (121), (123), (125), (127), surface units (141), (145), (147), well rigs (132), (133), (135), production equipment (137), surface storage tanks (150), production pipelines (153), and an E&P computer system (180) connected to the data acquisition tools (121), (123), (125), (127), through communication links (171) managed by a communication relay (170).

The geologic sedimentary basin (106) contains subterranean formations. As shown in FIG. 1, the subterranean formations may include several geological layers (106-1 through 106-6). As shown, the formation may include a basement layer (106-1), one or more shale layers (106-2, 106-4, 106-6), a limestone layer (106-3), a sandstone layer (106-5), and any other geological layer. A fault plane (107) may extend through the formations. In particular, the geologic sedimentary basin includes rock formations and may include at least one reservoir including fluids, for example the sandstone layer (106-5). In one or more embodiments, the rock formations include at least one seal rock, for example, the shale layer (106-6), which may act as a top seal. In one or more embodiments, the rock formations may include at least one source rock, for example the shale layer (106-4), which may act as a hydrocarbon generation source. The geologic sedimentary basin (106) may further contain hydrocarbon or other fluids accumulations associated with certain features of the subsurface formations. For example, accumulations (108-2), (108-5), and (108-7) associated with structural high areas of the reservoir layer (106-5) and containing gas, oil, water or any combination of these fluids.

In one or more embodiments, data acquisition tools (121), (123), (125), and (127), are positioned at various locations along the field (101) or field (102) for collecting data from the subterranean formations of the geologic sedimentary basin (106), referred to as survey or logging operations. In particular, various data acquisition tools are adapted to measure the formation and detect the physical properties of the rocks, subsurface formations, fluids contained within the rock matrix and the geological structures of the formation. For example, data plots (161), (162), (165), and (167) are depicted along the fields (101) and (102) to demonstrate the data generated by the data acquisition tools. Specifically, the static data plot (161) is a seismic two-way response time. Static data plot (162) is core sample data measured from a core sample of any of subterranean formations (106-1 to 106-6). Static data plot (165) is a logging trace, referred to as a well log. Production decline curve or graph (167) is a dynamic data plot of the fluid flow rate over time. Other data may also be collected, such as historical data, analyst user inputs, economic information, and/or other measurement data and other parameters of interest.

The acquisition of data shown in FIG. 1 may be performed at various stages of planning a well. For example, during early exploration stages, seismic data (161) may be gathered from the surface to identify possible locations of hydrocarbons. The seismic data may be gathered using a seismic source that generates a controlled amount of seismic energy. In other words, the seismic source and corresponding sensors (121) are an example of a data acquisition tool. An example of seismic data acquisition tool is a seismic acquisition vessel (141) that generates and sends seismic waves below the surface of the earth. Sensors (121) and other equipment located at the field may include functionality to detect the resulting raw seismic signal and transmit raw seismic data to a surface unit (141). The resulting raw seismic data may include effects of seismic wave reflecting from the subterranean formations (106-1 to 106-6).

Further as shown in FIG. 1, the fields (101) and (102) include one or more wellsite systems (192), (193), (195), and (197). A wellsite system is associated with a rig or a production equipment, a wellbore, and other wellsite equipment configured to perform wellbore operations, such as logging, drilling, fracturing, production, or other applicable operations. For example, the wellsite system (192) is associated with a rig (132), a wellbore (112), and drilling equipment to perform drilling operation (122). In one or more embodiments, a wellsite system may be connected to a production equipment. For example, the well system (197) is connected to the surface storage tank (150) through the fluids transport pipeline (153).

In one or more embodiments, the E&P computer system (180) is implemented by an E&P services provider by deploying applications with a cloud based infrastructure. As an example, the applications may include a web application that is implemented and deployed on the cloud and is accessible from a browser. Users (e.g., external clients of third parties and internal clients of the E&P services provider) may log into the applications and execute the functionality provided by the applications to analyze and interpret data, including the data from the surface units (141), (145), and (147). The E&P computer system and/or surface unit may correspond to a computing system, such as the computing system shown in FIGS. 5.1 and 5.2 and described below.

Figure 2:
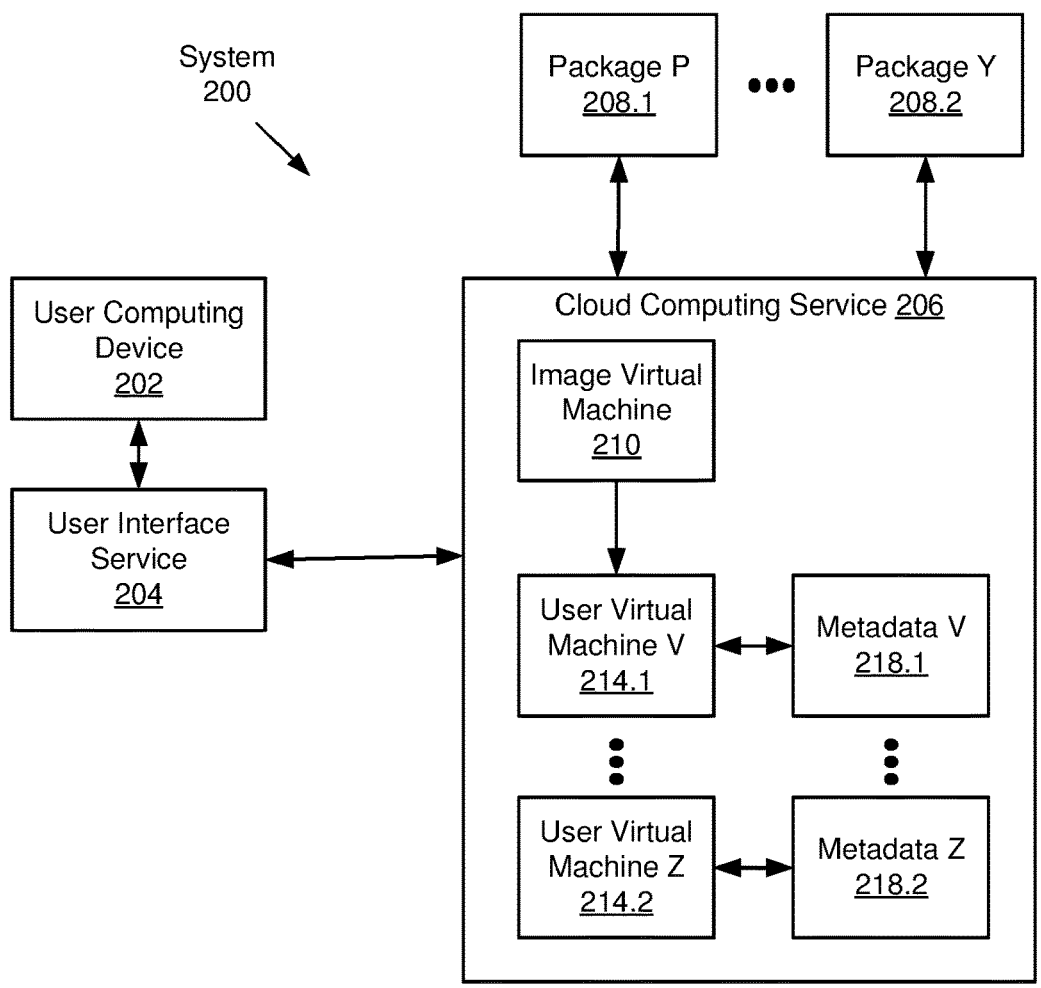
FIG. 2 shows a diagram of a system in accordance with one or more embodiments.

FIG. 2 shows a diagram of a system (200) in accordance with one or more embodiments. As shown in FIG. 2, the system (200) includes multiple components, such as a user computing device (202), a user interface service (204), and a cloud computing service (206), and packages (208.1, 208.2). Each of these components is described below.

The cloud computing service (206) may be executed on a computing system (500) shown in FIG. 5.1 connected to a network (520) as shown in FIG. 5.2. Examples of cloud computing services include: Azure, Google Cloud, Amazon Web Services (AWS), etc. The cloud computing service (206) includes an image virtual machine (210) and user virtual machines (214.1, 214.2). A virtual machine is a software implementation of a computing device executing on an underlying computing device (e.g., computing system (500)). A virtual machine may abstract the operating system and hardware of the underlying computing device from instructions that are executed in the virtual machine.

The cloud computing service (206) includes functionality to generate (e.g., provision), for a user, a user virtual machine (214.1) from an image virtual machine (210). The image virtual machine (210) is an initial virtual machine that is customized, for a user, into a user virtual machine (214.1). The image virtual machine (210) includes software components (e.g., an operating system, device drivers, etc.) to be included in each user virtual machine (214.1). In contrast, the user virtual machine (214.1) includes, in addition to the software components of the image virtual machine (210), one or more packages (e.g., package (208.1)) that are specific to the user. A package (208.1) is any software component that may be loaded into a virtual machine. For example, a package (208.1) may be an application program, a configuration file, etc. The cloud computing service (206) includes functionality to allocate computing resources (e.g., physical storage) to support the user virtual machine (214.1).

The cloud computing service (206) includes functionality to install a bootstrap agent as a startup service in a user virtual machine (214.1). Alternatively or additionally, the user virtual machine (214.1) may include functionality to self-install the bootstrap agent as a startup service in the user virtual machine (214.1). In one or more embodiments, the bootstrap agent is installed as a startup service in the user virtual machine (214.1) using a template. For example, the template (e.g., an Azure Resource Manager (ARM) template) may be a file that includes a uniform resource locator (URL) of a bootstrap script that includes instructions for installing the bootstrap agent. Continuing this example, the bootstrap script may be a PowerShell script in Windows, a Bash shell script in Linux, etc. In one or more embodiments, the cloud computing service (206) limits execution of the bootstrap script in the user virtual machine (214.1) to the generation of the user virtual machine (214.1). In other words, the cloud computing service (206) may disable execution of the bootstrap script in the user virtual machine (214.1) when an already-generated user virtual machine (214.1) is rebooted. The bootstrap agent includes functionality to install, in the user virtual machine (214.1), one or more packages that are specific to the user.

The template may further include metadata (218.1) corresponding to the user virtual machine (214.1). The bootstrap agent includes functionality to install the one or more packages in the user virtual machine (214.1) using the metadata (218.1) corresponding to the user virtual machine (214.1). The metadata (218.1) is a data structure that includes a uniform resource locator (URL) of a startup script. For example, the startup script may reference a file (e.g., a JavaScript Object Notation (JSON) file) including the URLs of the one or more packages that are specific to the user. The startup script may further include dependencies among packages. For example, a dependency may indicate which packages are to be installed before which other packages. Each user virtual machine (214.1, 214.2) corresponds to metadata (218.1, 218.2).

The user computing device (202) may be executed on a computing system (500) shown in FIG. 5.1 connected to a network (520) as shown in FIG. 5.2. The user computing device (202) includes functionality to send login credentials of a user to the user interface service (204). For example, the login credentials may correspond to a user virtual machine (214.1). The user computing device (202) may access the user virtual machine (214.1) via a browser running on the user computing device (202). For example, the browser may access the user virtual machine (214.1) via a remote desktop application.

The user computing device (202) provides, to a user, a variety of computing functionality. The user computing device (202) may be a mobile device (e.g., phone, tablet, digital assistant, laptop, etc.) or any other computing device (e.g., desktop, terminal, workstation, etc.) with a computer processor (not shown) and memory (not shown) capable of running computer software.

The user interface service (204) may be executed on a computing system (500) shown in FIG. 5.1 connected to a network (520) as shown in FIG. 5.2. The user interface service (204) includes functionality to validate login credentials of a user received from the user computing device (202). The user interface service (204) includes functionality to generate an authentication token from the login credentials. The user interface service (204) may send the authentication token to the cloud computing service (206). For example, the authentication token may enable the user to access a user virtual machine (214.1) on the cloud computing service (206). The user interface service (204) includes functionality to instruct the cloud computing service (206) to generate a user virtual machine (214.1) for the user.

While FIG. 2 shows a configuration of components, other configurations may be used without departing from the scope of the disclosure. For example, various components may be combined to create a single component. As another example, the functionality performed by a single component may be performed by two or more components.

FIG. 3.1 shows a flowchart in accordance with one or more embodiments of the disclosure. The flowchart depicts a process for executing a bootstrap agent in a virtual machine. One or more of the blocks in FIG. 3.1 may be performed by the components (e.g. the cloud computing service (206), user interface service (204) and/or user virtual machines (214.1, 214.2) of system (200)), discussed above in reference to FIG. 2. In one or more embodiments of the disclosure, one or more of the steps shown in FIG. 3.1 may be omitted, repeated, and/or performed in parallel, or in a different order than the order shown in FIG. 3.1. Accordingly, the scope of the disclosure should not be considered limited to the specific arrangement of steps shown in FIG. 3.1.

Initially, in Block 302, a user virtual machine is generated from an image virtual machine and a template. The template includes a uniform resource locator (URL) of a bootstrap script. The user interface service may instruct the cloud computing service to generate the user virtual machine for a user of the user computing device. The cloud computing service may receive the template from the user via the user interface service.

The cloud computing service may generate the user virtual machine by:
1) Downloading the bootstrap script in the user virtual machine from the URL of the bootstrap script; and
2) Executing the bootstrap script to install a bootstrap agent as a startup service in the user virtual machine. The template further includes metadata corresponding to the user virtual machine. The metadata includes a URL of a startup script (see Block 304 below). Installing the bootstrap agent in the user virtual machine includes:
a) providing the metadata to the bootstrap agent, and
b) storing the metadata in the user virtual machine.

The cloud computing service may install the bootstrap agent as a startup service after determining that the bootstrap agent is not already installed as a startup service in the user virtual machine.

The cloud computing service may generate (e.g., boot) different user virtual machines for different users. That is, each user virtual machine may correspond to a template that is specific to a user, where the template includes metadata that includes a URL of a startup script that is specific to the user.

In Block 304, the startup service is executed by the user virtual machine to install packages. First the startup service downloads the startup script from the URL of the startup script from the metadata. The startup script references a file including URLs of the packages. Next, the startup service downloads and installs the packages using the URLs of the packages included in the startup script. The startup service may maintain a list of installed packages in order to prevent a recursive dependency loop. For example, the startup service may check whether the name of a package is included in the list of installed packages before installing the package. The persistence of the startup service enables specialized installation of packages to generate specialized virtual machines.

The startup service may be executed each time the user virtual machine is booted. That is, the startup service may be executed the first time the user virtual machine is booted, and the startup service may be executed when the user virtual machine is rebooted. For example, while installing the packages, the installation of the packages may be suspended (e.g., by the startup service), and the user virtual machine rebooted using the image virtual machine and the template (see description of Block 302 above). Continuing this example, installing a series of packages may result in one or more reboots of a virtual machine. After each reboot of the user virtual machine, the startup service may be executed to resume the installation of the packages because the startup service is already installed (in Block 302 above) as a startup service in each already-generated user virtual machine. That is, the cloud computing service does not need to re-install the startup service by re-installing the bootstrap script in the already-generated user virtual machine. Thus, the startup service may execute after rebooting an already-generated user virtual machine even when the cloud computing service disables execution of the bootstrap script in an already-generated user virtual machine.

FIG. 3.2 shows a flowchart in accordance with one or more embodiments of the disclosure. The flowchart depicts a process for executing a bootstrap agent in a virtual machine. FIG. 3.2 provides additional detail to the Blocks performed in FIG. 3.1. One or more of the blocks in FIG. 3.2 may be performed by the components (e.g. the cloud computing service (206), user interface service (204) and/or user virtual machines (214.1, 214.2) of system (200)), discussed above in reference to FIG. 2. In one or more embodiments of the disclosure, one or more of the steps shown in FIG. 3.2 may be omitted, repeated, and/or performed in parallel, or in a different order than the order shown in FIG. 3.2. Accordingly, the scope of the disclosure should not be considered limited to the specific arrangement of steps shown in FIG. 3.2.

Initially, in Block 352, an image virtual machine (e.g., empty base image) is chosen (see description of Block 302 above). The image virtual machine may include software components, such as an operating system, software development tools, etc.

In Block 354, an Azure Resource Manager (ARM) template (or other cloud service template) is used to pass a bootstrap script uniform resource locator (URL) (e.g., extension script URL). The ARM template is used to generate the user virtual machine (see description of Block 302 above).

In Block 356, the user virtual machine is booted with the ARM template (see description of Block 302 above).

In Block 358, the user virtual machine securely downloads the bootstrap script from the bootstrap script URL and executes the bootstrap script (see description of Block 302 above).

In Block 360, the user virtual machine installs the bootstrap agent as a startup service if the user virtual machine determines that the bootstrap agent is not already installed as a startup service in the user virtual machine (see description of Block 302 above).

In Block 362, the startup service is started (see description of Block 304 above).

In Block 364, "instance" metadata corresponding to the user virtual machine is obtained (see description of Block 304 above).

In Block 366, the URL of the startup script is retrieved from the metadata (see description of Block 304 above).

In Block 368, the current environment of the user virtual machine is cleaned by deleting old files. For example, extraneous or temporary files may be deleted from the user virtual machine.

In Block 370, the startup script is downloaded from the location (e.g., the URL) mentioned in the metadata and installed in the user virtual machine (see description of Block 304 above).

In Block 372, execute privilege is provided to the downloaded startup script in the user virtual machine.

In Block 374, the startup script is executed in the user virtual machine (see description of Block 304 above).

In Block 376, the startup script reads a JavaScript Object Notation (JSON) (or other scripting language object notation) file (see description of Block 304 above). The JSON file lists packages to be installed and any dependencies among the packages to be installed. The JSON file includes the URLs of the packages to be installed.

In Block 378, the startup script installs the packages listed in the JSON file in the user virtual machine (see description of Block 304 above). The packages are installed according to the dependencies, if any, included in the JSON file.

Figure 4:
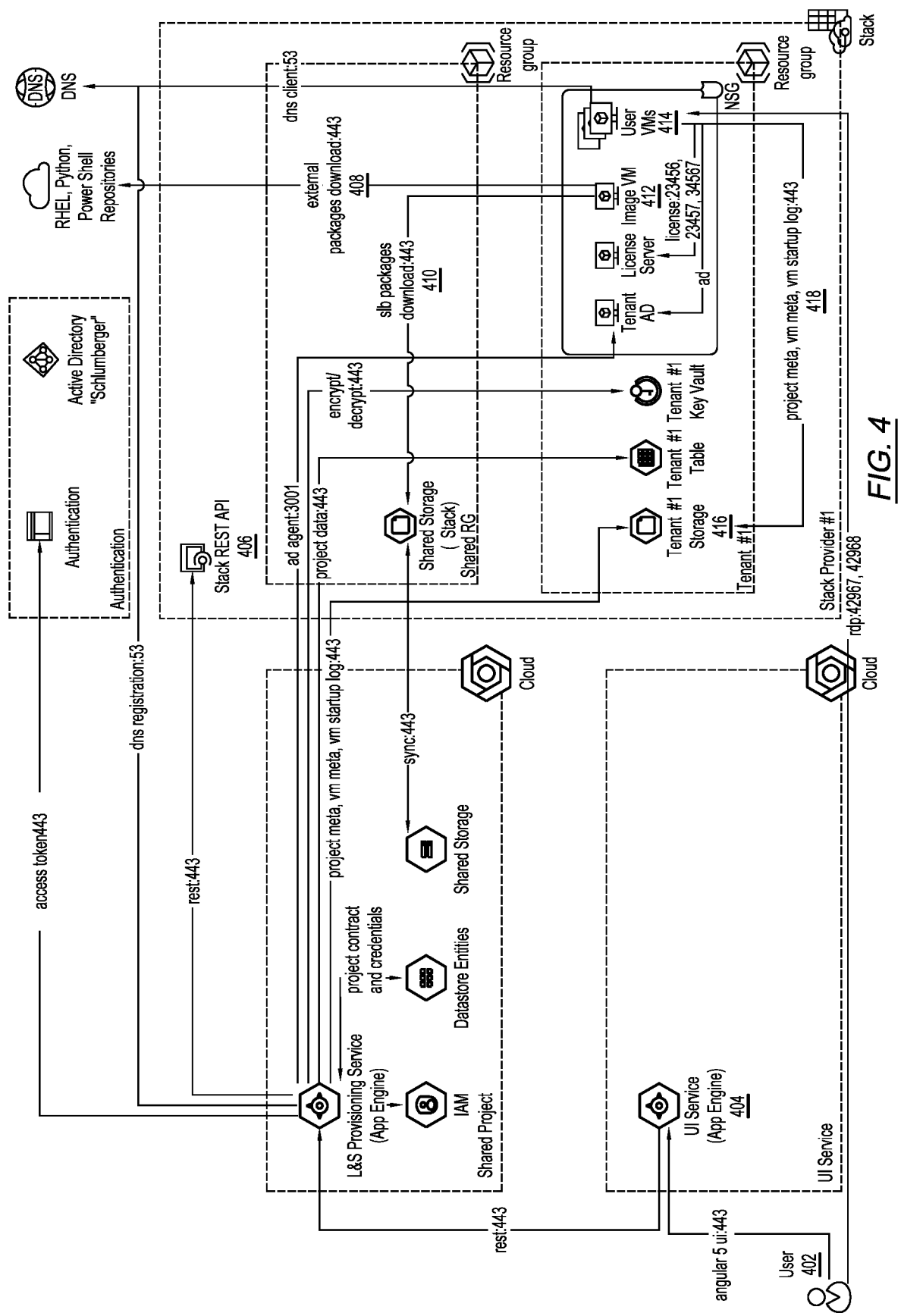
FIG. 4 shows an example in accordance with one or more embodiments.

FIG. 4 shows an implementation example in accordance with one or more embodiments. The implementation example is for explanatory purposes and not intended to limit the scope of the disclosure. One skilled in the art will appreciate that implementation of embodiments of the disclosure may take various forms and still be within the scope of the disclosure.

In particular, FIG. 4 shows a user (402) of a user computing device, a user interface service (404) ((204) in FIG. 2), a cloud computing service (406) ((206) in FIG. 2), packages (408, 410) ((208.1, 208.2) in FIG. 2), an image virtual machine (VM) (412) ((210) in FIG. 2), user virtual machines (VMs) (414) ((214.1, 214.2) in FIG. 2), and metadata (418) ((218.1, 218.2) in FIG. 2).

After the user interface service (404) authenticates the login credentials of the user (402), the cloud computing service (406) generates, from the image VM (412), a user VM (414) for the user (402) using a template. The template includes a uniform resource locator (URL) of a bootstrap script, which when downloaded and installed in the user VM (414), installs the bootstrap agent as a startup service in the user VM (414). The template also includes metadata (418) that includes a URL of a startup script that is specific to the user (402). The startup script references a file that includes URLs of the packages to be installed. The metadata (418) is stored in "tenant" storage (416) (e.g., a registry) that is specific to the user VM (414). In this example, the metadata (418) also specifies various parameters, such as resource group names, storage keys used to encrypt sensitive information, etc.

The startup service installs packages in the user VM (414) using the startup script. The packages to be installed include packages (408) internal to the cloud computing service (406) and packages (410) external to the cloud computing service (406).

Embodiments of the disclosure may be implemented on a computing system specifically designed to achieve an improved technological result. When implemented in a computing system, the features and elements of the disclosure provide a significant technological advancement over computing systems that do not implement the features and elements of the disclosure. Any combination of mobile, desktop, server, router, switch, embedded device, or other types of hardware may be improved by including the features and elements described in the disclosure. For example, as shown in FIG. 5.1, the computing system (500) may include one or more computer processors (502), non-persistent storage (504) (e.g., volatile memory, such as random access memory (RAM), cache memory), persistent storage (506) (e.g., a hard disk, an optical drive such as a compact disk (CD) drive or digital versatile disk (DVD) drive, a flash memory, etc.), a communication interface (512) (e.g., Bluetooth interface, infrared interface, network interface, optical interface, etc.), and numerous other elements and functionalities that implement the features and elements of the disclosure.

The computer processor(s) (502) may be an integrated circuit for processing instructions. For example, the computer processor(s) may be one or more cores or micro-cores of a processor. The computing system (500) may also include one or more input devices (510), such as a touchscreen, keyboard, mouse, microphone, touchpad, electronic pen, or any other type of input device.

The communication interface (512) may include an integrated circuit for connecting the computing system (500) to a network (not shown) (e.g., a local area network (LAN), a wide area network (WAN) such as the Internet, mobile network, or any other type of network) and/or to another device, such as another computing device.

Further, the computing system (500) may include one or more output devices (508), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (502), non-persistent storage (504), and persistent storage (506). Many different types of computing systems exist, and the aforementioned input and output device(s) may take other forms.

Software instructions in the form of computer readable program code to perform embodiments of the disclosure may be stored, in whole or in part, temporarily or permanently, on a non-transitory computer readable medium such as a CD, DVD, storage device, a diskette, a tape, flash memory, physical memory, or any other non-transitory computer readable storage medium. Specifically, the software instructions may correspond to computer readable program code that, when executed by a processor(s), is configured to perform one or more embodiments of the disclosure.

The computing system (500) in FIG. 5.1 may be connected to or be a part of a network. For example, as shown in FIG. 5.2, the network (520) may include multiple nodes (e.g., node X (522), node Y (524)). A node may correspond to a computing system, such as the computing system shown in FIG. 5.1, or a group of nodes combined may correspond to the computing system shown in FIG. 5.1. By way of an example, embodiments of the disclosure may be implemented on a node of a distributed system that is connected to other nodes. By way of another example, embodiments of the disclosure may be implemented on a distributed computing system having multiple nodes, where a portion of the disclosure may be located on a different node within the distributed computing system. Further, one or more elements of the aforementioned computing system (500) may be located at a remote location and connected to the other elements over a network.

Although not shown in FIG. 5.2, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (522), node Y (524)) in the network (520) may be configured to provide services for a client device (526). For example, the nodes may be part of a cloud computing system. The nodes may include functionality to receive requests from the client device (526) and transmit responses to the client device (526). The client device (526) may be a computing system, such as the computing system shown in FIG. 5.1. Further, the client device (526) may include and/or perform all or a portion of one or more embodiments of the disclosure.

The computing system or group of computing systems described in FIGS. 5.1 and 5.2 may include functionality to perform a variety of operations disclosed herein. For example, the computing system(s) may perform communication between processes on the same or different systems. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, only one authorized process may mount the shareable segment, other than the initializing process, at any given time.

Other techniques may be used to share data, such as the various data described in the present application, between processes without departing from the scope of the disclosure. The processes may be part of the same or different application and may execute on the same or different computing system.

Rather than or in addition to sharing data between processes, the computing system performing one or more embodiments of the disclosure may include functionality to receive data from a user. For example, in one or more embodiments, a user may submit data via a graphical user interface (GUI) on the user device. Data may be submitted via the graphical user interface by a user selecting one or more graphical user interface widgets or inserting text and other data into graphical user interface widgets using a touchpad, a keyboard, a mouse, or any other input device. In response to selecting a particular item, information regarding the particular item may be obtained from persistent or non-persistent storage by the computer processor. Upon selection of the item by the user, the contents of the obtained data regarding the particular item may be displayed on the user device in response to the user's selection.

By way of another example, a request to obtain data regarding the particular item may be sent to a server operatively connected to the user device through a network. For example, the user may select a uniform resource locator (URL) link within a web client of the user device, thereby initiating a Hypertext Transfer Protocol (HTTP) or other protocol request being sent to the network host associated with the URL. In response to the request, the server may extract the data regarding the particular selected item and send the data to the device that initiated the request. Once the user device has received the data regarding the particular item, the contents of the received data regarding the particular item may be displayed on the user device in response to the user's selection. Further to the above example, the data received from the server after selecting the URL link may provide a web page in Hyper Text Markup Language (HTML) that may be rendered by the web client and displayed on the user device.

Once data is obtained, such as by using techniques described above or from storage, the computing system, in performing one or more embodiments of the disclosure, may extract one or more data items from the obtained data. For example, the extraction may be performed as follows by the computing system in FIG. 5.1. First, the organizing pattern (e.g., grammar, schema, layout) of the data is determined, which may be based on one or more of the following: position (e.g., bit or column position, Nth token in a data stream, etc.), attribute (where the attribute is associated with one or more values), or a hierarchical/tree structure (consisting of layers of nodes at different levels of detail-such as in nested packet headers or nested document sections). Then, the raw, unprocessed stream of data symbols is parsed, in the context of the organizing pattern, into a stream (or layered structure) of tokens (where a token may have an associated token "type").

Next, extraction criteria are used to extract one or more data items from the token stream or structure, where the extraction criteria are processed according to the organizing pattern to extract one or more tokens (or nodes from a layered structure). For position-based data, the token(s) at the position(s) identified by the extraction criteria are extracted. For attribute/value-based data, the token(s) and/or node(s) associated with the attribute(s) satisfying the extraction criteria are extracted. For hierarchical/layered data, the token(s) associated with the node(s) matching the extraction criteria are extracted. The extraction criteria may be as simple as an identifier string or may be a query presented to a structured data repository (where the data repository may be organized according to a database schema or data format, such as XML).

The extracted data may be used for further processing by the computing system. For example, the computing system of FIG. 5.1, while performing one or more embodiments of the disclosure, may perform data comparison. Data comparison may be used to compare two or more data values (e.g., A, B). For example, one or more embodiments may determine whether $A>B$, $A=B$, $A\ !=B$, $A<B$, etc. The comparison may be performed by submitting A, B, and an opcode specifying an operation related to the comparison into an arithmetic logic unit (ALU) (i.e., circuitry that performs arithmetic and/or bitwise logical operations on the two data values). The ALU outputs the numerical result of the operation and/or one or more status flags related to the numerical result. For example, the status flags may indicate whether the numerical result is a positive number, a negative number, zero, etc. By selecting the proper opcode and then reading the numerical results and/or status flags, the comparison may be executed. For example, in order to determine if $A>B$, B may be subtracted from A (i.e., $A-B$), and the status flags may be read to determine if the result is positive (i.e., if $A>B$, then $A-B>0$). In one or more embodiments, B may be considered a threshold, and A is deemed to satisfy the threshold if $A=B$ or if $A>B$, as determined using the ALU. In one or more embodiments of the disclosure, A and B may be vectors, and comparing A with B requires comparing the first element of vector A with the first element of vector B, the second element of vector A with the second element of vector B, etc. In one or more embodiments, if A and B are strings, the binary values of the strings may be compared.

The computing system in FIG. 5.1 may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g. join, full join, count, average, etc.), sort (e.g. ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The computing system of FIG. 5.1 may include functionality to present raw and/or processed data, such as results of comparisons and other processing. For example, presenting data may be accomplished through various presenting methods. Specifically, data may be presented through a user interface provided by a computing device. The user interface may include a GUI that displays information on a display device, such as a computer monitor or a touchscreen on a handheld computer device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

For example, a GUI may first obtain a notification from a software application requesting that a particular data object be presented within the GUI. Next, the GUI may determine a data object type associated with the particular data object, e.g., by obtaining data from a data attribute within the data object that identifies the data object type. Then, the GUI may determine any rules designated for displaying that data object type, e.g., rules specified by a software framework for a data object class or according to any local parameters defined by the GUI for presenting that data object type. Finally, the GUI may obtain data values from the particular data object and render a visual representation of the data values within a display device according to the designated rules for that data object type.

Data may also be presented through various audio methods. In particular, data may be rendered into an audio format and presented as sound through one or more speakers operably connected to a computing device.

Data may also be presented to a user through haptic methods. For example, haptic methods may include vibrations or other physical signals generated by the computing system. For example, data may be presented to a user using a vibration generated by a handheld computer device with a predefined duration and intensity of the vibration to communicate the data.

The above description of functions present only a few examples of functions performed by the computing system of FIG. 5.1 and the nodes and/or client device in FIG. 5.2. Other functions may be performed using one or more embodiments of the disclosure.

While the disclosure has been described with respect to a limited number of embodiments, those skilled in the art, having benefit of this disclosure, will appreciate that other embodiments can be devised which do not depart from the scope of the disclosure as disclosed herein. Accordingly, the scope of the disclosure should be limited only by the attached claims.

What is claimed is:

1. A method comprising:
   generating, by a cloud computing service, a first user virtual machine from an image virtual machine and a first template comprising a first uniform resource locator (URL) of a bootstrap script by:
   instructing, by a user interface service, the cloud computing service to generate the first user virtual machine by providing the first template to the cloud computing service; and
   based on the instructing, performing by the cloud computing service:
   instantiating a first user virtual machine from the image virtual machine;
   downloading, in the first user virtual machine and from the first URL, the bootstrap script;
   executing the bootstrap script to install a bootstrap agent as a first startup service in the first user virtual machine; and
   subsequent to the installation of the bootstrap agent, providing metadata to the bootstrap agent, wherein the providing comprises:
   retrieving the metadata as associated with a startup script referencing further URLs of packages utilized in installation of the first user virtual machine;
   storing the metadata; and
   executing the first startup service, wherein the executing further comprises:
   installing the packages utilized in an installation of the first user virtual machine by referencing the further URLs;
   based on a partial installation of the packages utilized in the installation of the first user virtual machine, initiating a reboot of the first user virtual machine;
   based on the reboot of the first user virtual machine and prior to its completion, determining whether the first startup service exist for the first user virtual machine;
   if the first startup service exists, continuing a boot-up of the first user virtual machine without installing the bootstrap agent; and
   based on the boot-up of the first user virtual machine, continuing the installation of remaining packages of the packages utilized in the installation of the first user virtual machine by referencing the further URLs.

2. The method of claim 1, further comprising:
   generating a second user virtual machine from the image virtual machine and a second template comprising the first URL of the bootstrap script by:
   downloading, in the second user virtual machine and from the first URL, the bootstrap script;
   executing the bootstrap script to install the bootstrap agent as a second startup service in the second user virtual machine; and
   executing, by the second user virtual machine, the second startup service to install a second plurality of packages.

3. The method of claim 2, wherein the second template further comprises second metadata comprising a second URL of a second startup script, wherein installing the bootstrap agent in the second user virtual machine comprises:
   providing, to the bootstrap agent, the second metadata, and storing the second metadata in the second user virtual machine, and wherein executing the second startup service further comprises:
   downloading, from the second URL, the second startup script, and installing the second plurality of packages using the second startup script.

4. The method of claim 2, wherein the startup script references a file comprising the further URLs of the packages utilized in the installation of the first user virtual machine, and wherein using the first startup script to install the packages utilized in the installation of the first user virtual machine comprises downloading, by the first startup service and from the further URLs, the packages utilized in the installation of the first user virtual machine.

5. The method of claim 1, further comprising:
   determining that the bootstrap agent is not installed in the first user virtual machine, wherein the bootstrap agent is installed as the first startup service in the first user virtual machine in response to determining that the bootstrap agent is not installed in the first user virtual machine.

6. A system comprising:
an image virtual machine;
a first user virtual machine configured to execute a first startup service to install a first plurality of packages; and
a cloud computing service executed on a computing system and configured to generate the first user virtual machine from the image virtual machine and a first template comprising a first uniform resource locator (URL) of a bootstrap script by:
  instructing, by a user interface service, the cloud computing service to generate the first user virtual machine by providing a template to the cloud computing service;
  based on the instructing, performing by the cloud computing service:
  instantiating a first user virtual machine from the image virtual machine;
  downloading, in the first user virtual machine and from the first URL, the bootstrap script;
  executing the bootstrap script to install a bootstrap agent as the first startup service in the first user virtual machine; and
  subsequent to the installation of the bootstrap agent, providing metadata to the bootstrap agent, wherein the providing comprises:
    retrieving the metadata as associated with a startup script referencing further URLs of packages utilized in installation of the first user virtual machine;
    storing the metadata; and
    executing the first startup service, wherein the executing further comprises:
      installing the packages utilized in an installation of the first user virtual machine by referencing the further URLs;
      based on a partial installation of the packages utilized in the installation of the first user virtual machine, initiating a reboot of the first user virtual machine;
      based on the reboot of the first user virtual machine and prior to its completion, determining whether the first startup service exist for the first user virtual machine;
      if the first startup service exists, continuing a boot-up of the first user virtual machine without installing the bootstrap agent; and
      based on the boot-up of the first user virtual machine, continuing the installation of remaining packages of the packages utilized in the installation of the first user virtual machine by referencing the further URLs.

7. The system of claim 6, wherein the cloud computing service is further configured to generate a second user virtual machine from the image virtual machine and a second template comprising the first URL of the bootstrap script by:
  downloading, in the second user virtual machine and from the first URL, the bootstrap script; and
  executing the bootstrap script to install the bootstrap agent as a second startup service in the second user virtual machine, and wherein the second user virtual machine is configured to execute the second startup service to install a second plurality of packages.

8. The system of claim 7, wherein the second template further comprises second metadata comprising a second URL of a second startup script, wherein the cloud computing service is further configured to install the bootstrap agent in the second user virtual machine by:
  providing, to the bootstrap agent, the second metadata, and storing the second metadata in the second user virtual machine, and wherein the second user virtual machine is further configured to execute the second startup service by:
    downloading, from the second URL, the second startup script, and installing the second plurality of packages using the second startup script.

9. The system of claim 7, wherein the startup script references a file comprising the further URLs of the packages utilized in the installation of the first user virtual machine, and wherein using the first startup script to install the packages utilized in the installation of the first user virtual machine comprises downloading, by the first startup service and from the further URLs, the packages utilized in the installation of the first user virtual machine.

10. The system of claim 6, wherein the cloud computing service is further configured to:
  determine that the bootstrap agent is not installed in the first user virtual machine, wherein the bootstrap agent is installed as the first startup service in the first user virtual machine in response to determining that the bootstrap agent is not installed in the first user virtual machine.

11. A non-transitory computer readable medium comprising instructions that, when executed by a computer processor, perform:
  instructing, by a user interface service, a cloud computing service to generate a first user virtual machine by providing a first template to the cloud computing service; and
  based on the instructing, performing by the cloud computing service:
    instantiating the first user virtual machine from an image virtual machine;
    downloading, by the first user virtual machine and from a first uniform resource locator (URL), a bootstrap script, the first template comprising the first URL;
    executing, by the first user virtual machine, the bootstrap script to install a bootstrap agent as a first startup service; and
    subsequent to the installation of the bootstrap agent, providing metadata to the bootstrap agent, wherein the providing comprises:
      retrieving the metadata as associated with a startup script referencing further URLs of packages utilized in installation of the first user virtual machine;
      storing the metadata; and
      executing the first startup service, wherein the executing further comprises:
        installing the packages utilized in an installation of the first user virtual machine by referencing the further URLs;
        based on a partial installation of the packages utilized in the installation of the first user virtual machine, initiating a reboot of the first user virtual machine;
        based on the reboot of the first user virtual machine and prior to its completion, determining whether the first startup service exist for the first user virtual machine;

if the first startup service exists, continuing a boot-up of the first user virtual machine without installing the bootstrap agent; and based on the boot-up of the first user virtual machine, continuing the installation of remaining packages of the packages utilized in the installation of the first user virtual machine by referencing the further URLs.

12. The non-transitory computer readable medium of claim 11, wherein the instructions further perform:

downloading, by a second user virtual machine and from the first URL, the bootstrap script, wherein the second user virtual machine is generated by the cloud computing service from the image virtual machine and a second template comprising the first URL;

executing, by the second user virtual machine, the bootstrap script to install the bootstrap agent as a second startup service; and executing, by the second user virtual machine, the second startup service to install a second plurality of packages.

13. The non-transitory computer readable medium of claim 12, wherein the second template further comprises second metadata comprising a second URL of a second startup script, wherein installing the bootstrap agent in the second user virtual machine comprises:

providing, to the bootstrap agent, the second metadata, and storing the second metadata in the second user virtual machine, and wherein executing the second startup service further comprises:

downloading, from the second URL, the second startup script, and installing the second plurality of packages using the second startup script.

14. The non-transitory computer readable medium of claim 12, wherein the first startup script references a file comprising the further URLs of the packages utilized in the installation of the first user virtual machine, and wherein using the first startup script to install the packages utilized in the installation of the first user virtual machine comprises downloading, by the first startup service and from the further URLs, the packages utilized in the installation of the first user virtual machine.

15. The non-transitory computer readable medium of claim 11, wherein the instructions further perform:

determining that the bootstrap agent is not installed in the first user virtual machine, wherein the bootstrap agent is installed as the first startup service in the first user virtual machine in response to determining that the bootstrap agent is not installed in the first user virtual machine.

* * * * *